United States Patent
Zouiten et al.

(10) Patent No.: US 10,232,268 B2
(45) Date of Patent: *Mar. 19, 2019

(54) PROMOTION GENERATION ENGINE FOR A MONEY TRANSFER SYSTEM

(71) Applicant: MoneyGram International, Inc., Dallas, TX (US)

(72) Inventors: Yassir Zouiten, Irving, TX (US); Dorilyn Lee Sletten, Maple Grove, MN (US)

(73) Assignee: MoneyGram International, Inc., Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/948,334

(22) Filed: Apr. 9, 2018

(65) Prior Publication Data

US 2018/0221771 A1    Aug. 9, 2018

Related U.S. Application Data

(63) Continuation of application No. 15/694,293, filed on Sep. 1, 2017, now Pat. No. 9,943,761, which is a
(Continued)

(51) Int. Cl.
*A63F 9/24*        (2006.01)
*A63F 13/61*       (2014.01)
(Continued)

(52) U.S. Cl.
CPC ............. *A63F 13/61* (2014.09); *A63F 13/12* (2013.01); *A63F 13/335* (2014.09); *G06Q 20/10* (2013.01);
(Continued)

(58) Field of Classification Search
USPC .................................. 463/31–42; 705/35, 43
See application file for complete search history.

(56) References Cited

U.S. PATENT DOCUMENTS 5,326,960 A    7/1994 Tannenbaum
5,432,326 A    7/1995 Noblett, Jr. et al.
(Continued)

FOREIGN PATENT DOCUMENTS

EP          1866861 A2     12/2007
WO       WO0146778 A2      6/2001
WO     WO2009052365 A1     4/2009

OTHER PUBLICATIONS

"Money Transmitter Services", snapshot taken Oct. 2011, http://web.archive.org/web/20111 0121 00544/http://www.dfs.ny.gov/consumer/usingamoneytrans.htm, 2 pages.
(Continued)

*Primary Examiner* — Masud Ahmed

(57) ABSTRACT

A money transfer system is promoted by providing a user access to a game or contest generated by a promotions engine computer. The user is directed to a customer relations portal accessible via an access device to participate in the game or contest. The customer relations portal comprising a server configured to manage the game or contest and associated with the promotions engine computer. A response is received from the user at the server related to the user's participation in the game or contest. The server determines whether the user is to receive a reward or prize based on the response from the user, and an output is provided to the user on the access device indicating whether the user is to receive the reward or prize.

20 Claims, 2 Drawing Sheets

Related U.S. Application Data continuation of application No. 14/172,635, filed on Feb. 4, 2014, now Pat. No. 9,751,006, which is a continuation of application No. 13/685,303, filed on Nov. 26, 2012, now Pat. No. 8,657,688.

(51) Int. Cl.
    *A63F 13/335* (2014.01)
    *A63F 13/30* (2014.01)
    *G07F 17/32* (2006.01)
    *G06Q 20/10* (2012.01)
    *G06Q 30/02* (2012.01)
    *H04L 29/08* (2006.01)

(52) U.S. Cl.
    CPC ..... *G06Q 30/0209* (2013.01); *G07F 17/3255* (2013.01); *H04L 67/306* (2013.01); *H04L 67/18* (2013.01)

(56) References Cited

U.S. PATENT DOCUMENTS

| | | |
|---|---|---|
| 5,434,929 A | 7/1995 | Beernink et al. |
| 5,864,483 A | 1/1999 | Brichta |
| 5,920,848 A | 7/1999 | Schutzer et al. |
| 5,974,146 A | 10/1999 | Randle et al. |
| 6,010,067 A | 1/2000 | Elbaum |
| 6,018,718 A | 1/2000 | Walker et al. |
| 6,073,090 A | 6/2000 | Fortune et al. |
| 6,139,177 A | 10/2000 | Venkatraman et al. |
| 6,205,433 B1 | 3/2001 | Boesch et al. |
| 6,292,786 B1 | 9/2001 | Deaton et al. |
| 6,370,514 B1 | 4/2002 | Messner |
| 6,687,679 B1 | 2/2004 | Van Luchene et al. |
| 6,915,271 B1 | 7/2005 | Meyer et al. |
| 6,938,013 B1 | 8/2005 | Gutierrez-Sheris |
| 7,050,983 B2 | 5/2006 | Kawai |
| 7,213,744 B2 | 5/2007 | Michelsen et al. |
| 7,258,268 B2 | 8/2007 | Steiger, Jr. |
| 7,356,505 B2 | 4/2008 | March |
| 7,406,445 B1 | 7/2008 | Silverbrook et al. |
| 7,490,062 B2 | 2/2009 | Hansmann et al. |
| 7,568,615 B2 | 8/2009 | Corona et al. |
| 7,647,244 B2 | 1/2010 | Platner et al. |
| 7,660,734 B1 | 2/2010 | Neal et al. |
| 7,693,789 B2 | 4/2010 | Degen et al. |
| 7,742,942 B2 | 6/2010 | Nicholson |
| 7,761,344 B2 | 7/2010 | Smith |
| 7,761,367 B1 | 7/2010 | Scalora et al. |
| 7,797,192 B2 | 9/2010 | Mitchell et al. |
| 7,810,067 B2 | 10/2010 | Kaelicke et al. |
| 7,925,513 B2 | 4/2011 | Chao et al. |
| 8,019,679 B2 | 9/2011 | Bennett et al. |
| 8,082,210 B2 | 12/2011 | Hansen et al. |
| 8,090,594 B2 | 1/2012 | Grant et al. |
| 8,463,702 B2 | 6/2013 | Bennett et al. |
| 8,571,980 B1 | 10/2013 | Greenwood |
| 8,589,918 B1 | 11/2013 | Sapuntzakis et al. |
| 8,657,688 B1 | 2/2014 | Zouiten et al. |
| 8,688,570 B2 | 4/2014 | Jones et al. |
| 8,788,278 B2 | 7/2014 | Scribner et al. |
| 8,851,366 B2 | 10/2014 | Modi |
| 9,076,134 B2 | 7/2015 | Grovit et al. |
| 9,092,763 B2 | 7/2015 | Meszaros et al. |
| 9,751,006 B2 | 9/2017 | Zouiten et al. |
| 9,943,761 B2 | 4/2018 | Zouiten et al. |
| 2001/0014868 A1 | 8/2001 | Herz et al. |
| 2002/0002505 A1 | 1/2002 | Kojima |
| 2002/0052778 A1 | 5/2002 | Murphy et al. |
| 2002/0055907 A1 | 5/2002 | Pater et al. |
| 2002/0062249 A1 | 5/2002 | Iannacci |
| 2002/0091603 A1 | 7/2002 | Steiger et al. |
| 2002/0111908 A1 | 8/2002 | Milberger et al. |
| 2002/0143566 A1* | 10/2002 | Diveley .............. G06Q 20/02 705/74 |
| 2002/0152177 A1 | 10/2002 | Wolf |
| 2003/0080185 A1 | 5/2003 | Werther |
| 2003/0110072 A1 | 6/2003 | Delurgio et al. |
| 2003/0130883 A1 | 7/2003 | Schroeder et al. |
| 2003/0182228 A1 | 9/2003 | Wolf |
| 2003/0208384 A1 | 11/2003 | Nelson et al. |
| 2003/0220830 A1 | 11/2003 | Myr |
| 2004/0030647 A1 | 2/2004 | Hansen et al. |
| 2004/0143496 A1 | 7/2004 | Saenz |
| 2004/0167815 A1 | 8/2004 | DeLaHunt |
| 2004/0172358 A1 | 9/2004 | Lent et al. |
| 2004/0199462 A1 | 10/2004 | Starrs |
| 2004/0205023 A1 | 10/2004 | Hafer et al. |
| 2005/0131816 A1 | 6/2005 | Britto et al. |
| 2005/0177496 A1 | 8/2005 | Blagg et al. |
| 2005/0209961 A1 | 9/2005 | Michelsen et al. |
| 2005/0246268 A1 | 11/2005 | Foran et al. |
| 2006/0047672 A1 | 3/2006 | Habon et al. |
| 2006/0074627 A1 | 4/2006 | Moore et al. |
| 2006/0253321 A1 | 11/2006 | Heywood |
| 2006/0261150 A1 | 11/2006 | Seifert et al. |
| 2006/0287953 A1 | 12/2006 | Chauhan |
| 2007/0033112 A1 | 2/2007 | Nagle, Jr. |
| 2007/0073617 A1 | 3/2007 | Tolbert et al. |
| 2007/0088610 A1 | 4/2007 | Chen |
| 2007/0121843 A1 | 5/2007 | Atazky et al. |
| 2007/0203821 A1 | 8/2007 | DuFour |
| 2007/0221728 A1 | 9/2007 | Ferro et al. |
| 2007/0233615 A1 | 10/2007 | Tumminaro |
| 2007/0255662 A1 | 11/2007 | Tumminaro |
| 2008/0046381 A1 | 2/2008 | Naccache |
| 2008/0109279 A1 | 5/2008 | Csoka |
| 2008/0140568 A1 | 6/2008 | Henry |
| 2008/0147506 A1 | 6/2008 | Ling |
| 2008/0154719 A1 | 6/2008 | Gounares et al. |
| 2008/0249908 A1 | 10/2008 | Lorberg et al. |
| 2008/0275771 A1 | 11/2008 | Levine |
| 2008/0301040 A1 | 12/2008 | Knudson et al. |
| 2009/0006233 A1 | 1/2009 | Chemtob |
| 2009/0037311 A1* | 2/2009 | Omar .............. G06Q 40/00 705/35 |
| 2009/0063261 A1 | 3/2009 | Scribner et al. |
| 2009/0063331 A1 | 3/2009 | Rodin |
| 2009/0089172 A1 | 4/2009 | Quinlan et al. |
| 2009/0100168 A1 | 4/2009 | Harris |
| 2009/0106149 A1 | 4/2009 | Bennett et al. |
| 2009/0157520 A1 | 6/2009 | Algiene et al. |
| 2010/0100426 A1 | 4/2010 | Sander et al. |
| 2010/0100477 A1 | 4/2010 | Giammanco |
| 2010/0114774 A1 | 5/2010 | Linaman et al. |
| 2010/0153225 A1 | 6/2010 | Ferro et al. |
| 2010/0161485 A1 | 6/2010 | Bulawa et al. |
| 2010/0235283 A1* | 9/2010 | Gerson .............. G06Q 20/1085 705/75 |
| 2010/0299761 A1* | 11/2010 | Shapiro ................ G06Q 10/107 726/28 |
| 2011/0137796 A1 | 6/2011 | Tullis |
| 2011/0246328 A1 | 10/2011 | Dunwoody et al. |
| 2011/0282790 A1 | 11/2011 | Bennett et al. |
| 2012/0010993 A1 | 1/2012 | Ferrara et al. |
| 2012/0016795 A1 | 1/2012 | Hill et al. |
| 2012/0030098 A1 | 2/2012 | Bulawa et al. |
| 2012/0036071 A1 | 2/2012 | Fulton et al. |
| 2012/0209769 A1 | 8/2012 | Rolfs et al. |
| 2012/0245987 A1* | 9/2012 | Isaacson ................ G06Q 30/06 705/14.23 |
| 2012/0303524 A1 | 11/2012 | Bertram et al. |
| 2013/0060690 A1* | 3/2013 | Oskolkov .............. G06Q 20/42 705/43 |
| 2013/0073457 A1 | 3/2013 | Sander et al. |
| 2013/0132067 A1 | 5/2013 | Gelbman |
| 2013/0151418 A1* | 6/2013 | Licciardello ........... G06Q 20/02 705/72 |
| 2013/0179334 A1 | 7/2013 | Nardone et al. |
| 2013/0191194 A1* | 7/2013 | Shreibati ............ G06Q 30/0209 705/14.12 |
| 2013/0282561 A1 | 10/2013 | Runkle et al. |
| 2013/0325720 A1 | 12/2013 | Bennett et al. |
| 2014/0207664 A1 | 7/2014 | Sander et al. |

(56) References Cited

U.S. PATENT DOCUMENTS

| | | |
|---|---|---|
| 2014/0213345 A1 | 7/2014 | Zouiten et al. |
| 2014/0244414 A1 | 8/2014 | Runkle et al. |
| 2014/0250014 A1 | 9/2014 | Runkle et al. |
| 2014/0278900 A1 | 9/2014 | Scribner et al. |
| 2014/0279228 A1 | 9/2014 | Fry et al. |
| 2015/0039499 A1 | 2/2015 | Christophersen et al. |
| 2015/0149355 A1 | 5/2015 | Arnthong et al. |
| 2017/0361231 A1 | 12/2017 | Zouiten et al. |

OTHER PUBLICATIONS

Banorte Selects Moneygram for US Transfers—Mexico, Apr. 17, 2002, Business News Americas—Latin America's Business Information Leader, 1 page.

Information on MoneyGram.com 2003-2006, archived web pages printed from www.archive.org, Sep. 7, 2010.

International Search Report and Written Opinion issued in PCT/US2008/080292, dated Jan. 20, 2009, 14 pages.

International Search Report and Written Opinion issued in PCT/US2012/022491, dated Jul. 5, 2012, 10 pages.

International Search Report and Written Opinion issued in PCT/US2012/038607, dated Nov. 13, 2012, 20 pages.

International Search Report and Written Opinion issued in PCT/US2013/037595, dated Jul. 30, 2013, 11 pages.

Listingbook, LLC v. Market Leader, Inc., F.Supp.3d (2015), Westlaw 2015 WI 7176455, 12 pages.

MoneyGram Adds 1,500 Bancomer Locations in Mexico, Apr. 17, 2001, 2 pages.

MoneyGram Corporate—How to transfer money, MoneyGram. International, webpages from http://www.moneygram.com/MGICorp/ConsumerProducts . . . , 5 Pages; May 30, 2007.

Press release from Norkom Technologies, "Wall Street's Back Office Launches Market-Leading AML software from Norkom," Feb. 15, 2007, 2 pages, http://www.norkom.com.

\* cited by examiner

PROMOTION GENERATION ENGINE FOR A MONEY TRANSFER SYSTEM

CROSS-REFERENCE TO RELATED APPLICATION

This application is a continuation of U.S. patent application Ser. No. 15/694,293, filed Sep. 1, 2017, entitled PROMOTION GENERATION ENGINE FOR A MONEY TRANSFER SYSTEM, to be issued as U.S. Pat. No. 9,943,761 on Apr. 17, 2018, which is a continuation of U.S. patent application Ser. No. 14/172,635, filed Feb. 4, 2014, entitled PROMOTION GENERATION ENGINE FOR A MONEY TRANSFER SYSTEM, now U.S. Pat. No. 9,751,006, issued on Sep. 5, 2017, which is a continuation of U.S. patent application Ser. No. 13/685,303, filed Nov. 26, 2012, entitled PROMOTION GENERATION ENGINE FOR A MONEY TRANSFER SYSTEM, now U.S. Pat. No. 8,657,688, issued on Feb. 25, 2014, all of which are incorporated herein by reference in their entireties and for all purposes.

TECHNICAL FIELD

The present invention relates generally to money transfer systems. More specifically, the present invention relates to a money transfer system including a promotion generation engine configured to generate promotions for customers.

BACKGROUND

A number of businesses offer money transfer and other services through a network of agents and computers. A consumer that desires to use these services to transfer money to a third party takes the money to one of the agents or computers associated with the business. The agent or computer accepts the money, obtains necessary information such as the consumer's identity and the identity of the third party transferee, and initiates a transaction. The money is then made available to the third party transferee by another agent or another computer.

Only limited consumer identity information, such as name and/or phone number, is typically collected to initiate a transaction. It can thus be difficult to effectively market money transfer services to relevant groups and individual consumers.

SUMMARY

In one aspect, the present disclosure relates to a method for promoting a money transfer system. Access is provided to a user to a game or contest generated by a promotions engine computer. The user is directed to a customer relations portal accessible via an access device to participate in the game or contest. The customer relations portal comprising a server configured to manage the game or contest and associated with the promotions engine computer. A response is received from the user at the server related to the user's participation in the game or contest. The server determines whether the user is to receive a reward or prize based on the response from the user, and an output is provided to the user on the access device indicating whether the user is to receive the reward or prize. In some embodiments, a user profile is maintained on the server that includes identification and informational data of the user, transaction history of the user on the money transfer system, and participation history of the user in other games or contests. In some embodiments, the promotions engine computer is configured to customize the game or contest based on the user profile. The access device can include a user computer on which a website can be entered to access the customer relations portal, and/or a user interface can be generated that allows the user to alert other individuals about the game or contest. When the user alerts another user about the game or contest, the user can be provided with an additional reward or prize. In some embodiments, the server is configured to determine whether the user's response successfully completes the game or contest and, if the user's response is successful, whether the user's response was one of the first predetermined number of successful responses received at the server. In some embodiments, the game or contest comprises a trivia question, and the response comprises an answer to the trivia question.

In another aspect, the present disclosure relates to a method for promoting a money transfer system. A money transfer transaction request, which includes identification information of the user, is received from a user for a money transfer transaction. A user profile based on the user's identification information is accessed on a server. The user profile includes identification and informational data of the user, and transaction history of the user on the money transfer system. A game or contest is generated on a promotions engine computer, which in some embodiments is customized based on the date, user's location, and/or user profile. The user is directed to a customer relations portal accessible via an access device to participate in the game or contest. The customer relations portal is configured to manage the game or contest. A response is received from the user at the server related to the user's participation in the game or contest, and it is determined whether the user is to receive a reward or prize based on the response from the user. An output is then provided to the user on the access device indicating whether the user is to receive the reward or prize. The access device can include a user computer on which a user interface can be generated that allows the user to alert other individuals about the game or contest. When the user alerts another user about the game or contest, the user can be provided with an additional reward or prize. In some embodiments, access information for the game or contest is printed on a receipt for the money transfer transaction. In some embodiments, the server is configured to determine whether the user's response successfully completes the game or contest and, if the user's response is successful, whether the user's response was one of the first predetermined number of successful responses received at the server. In some embodiments, the game or contest comprises a trivia question, and the response comprises an answer to the trivia question.

In a further aspect, a promotion generation system associated with a money transfer system includes a promotions engine computer and a server. The promotions engine computer is configured to generate a game or contest and provide access to the game or contest to users of the money transfer system. The server is configured to receive a response from the users related to the users' participation in the game or contest. Each user provides the response to the server via an access device that communicates with the server. The server is further configured to determine whether each user is to receive a reward or prize based on that user's response and to provide an output to the user on the access device indicating whether the user is to receive the reward or prize. In some embodiments, the system further includes a user profile database associated with the promotions engine computer and configured to store a user profile associated with each of the users of the money transfer system. Each user profile includes identification and informational data of the associated user, transaction history of the user on the money transfer system, and participation history of the user in other games or contests. In some embodiments, the promotions engine computer is configured to customize the game or contest for each user based on the user's associated user profile. The access device can include a user computer on which a user interface can be generated that allows the user to alert other individuals about the game or contest. When the user alerts another user about the game or contest, the user can be provided with an additional reward or prize. In some embodiments, the server is further configured to determine whether the user's response successfully completes the game or contest and, if the user's response is successful, determine whether the user's response was one of the first predetermined number of successful responses received at the server. In some embodiments, the game or contest comprises a trivia question, and the response comprises an answer to the trivia question.

Figure 1:
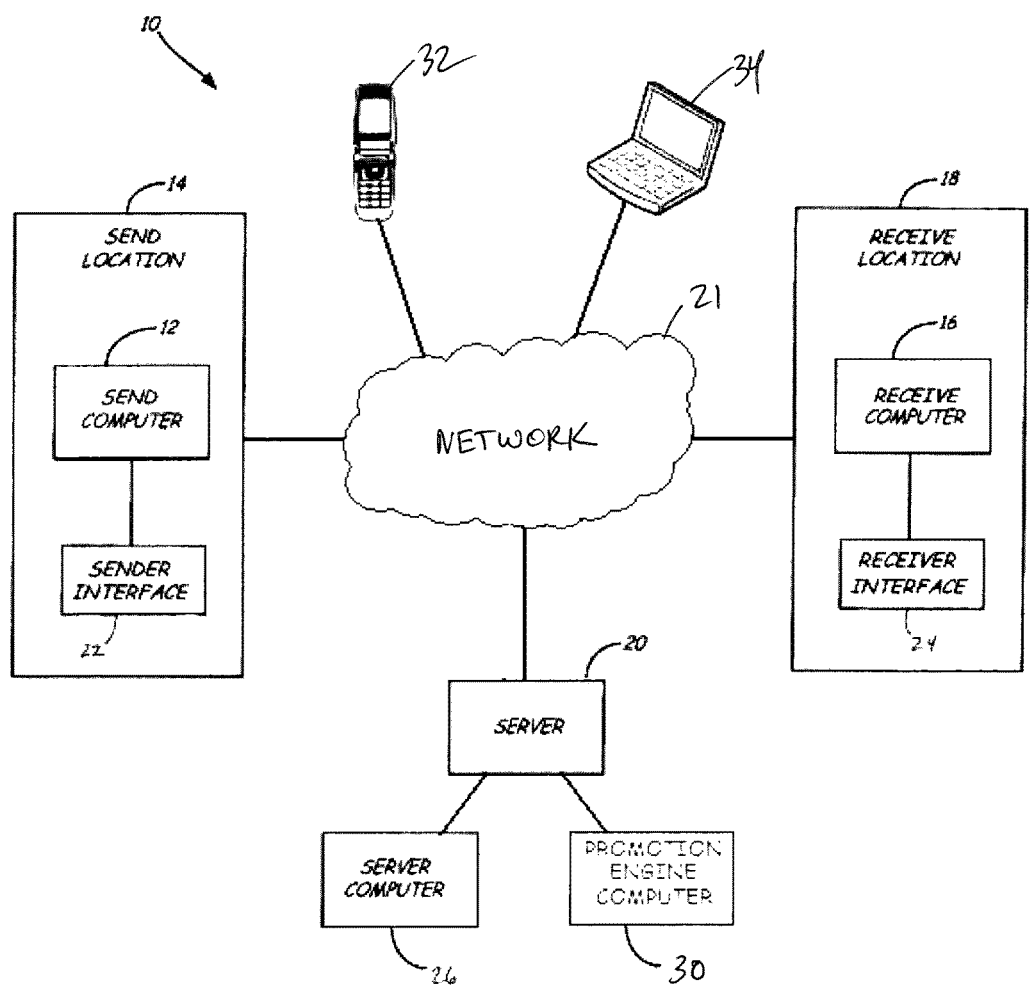
FIG. 1 is a schematic view of an embodiment of a system a money transfer system including a promotion generation computer configured to generate promotions for customers.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a block diagram of an embodiment of a system 10 for sending and receiving money transfers. System 10 includes a send computer 12 at a send location 14 and a receive computer 16 at a receive location 18. The send computer 12 and the receive computer 16 communicate with a central server 20, for example via a communication network 21, such as the internet. In some embodiments, a sender interface 22 is connected to the send computer 12, and a receiver interface 24 is connected to the receive computer 16. The system 10 facilitates, in part, the sending of money transfers through the send computer 12, and the receipt of the money transfer through the receive computer 16.

The send location 14 may be a facility that is approved by a financial services organization to send purchase requests for money transfers to the server 20. The send location 14 may be a store or dedicated location that provides redemption services for money transfers. Alternatively, the send location 14 may access a computer remotely, such as via a telephone call or the internet. The send computer 12 is operated by an agent at the approved send location 14. The send computer 12 may include software that facilitates entry of information via the sender interface 22 to request sending the money transfer for subsequent transmission to the server 20 for approval. The agent at the send location 14 may also review purchaser identification and accept funds from the sender of the money transfer. In some embodiments, the agent accepts funds on behalf of the financial services organization. The send location 14 may also include a telephone (not shown) or other voice communications device to contact the financial services organization if questions arise during the money transfer request process. While a single send location 14 is shown in FIG. 1, in actual implementation, the system 10 includes a plurality of send locations 14 that each includes a send computer 12 that communicates with the server 20.

In alternative embodiments, the send computer 12 may be any computer configured to provide information to the server 20 via a secure internet or server connection. For example, the send computer 12 may be a home computer, kiosk, or other interactive device with an associated sender interface 22 (e.g., keyboard, touch screen). The send computer 12 may include a web browser or other application that provides a user interface to enter information to send a money transfer. The web browser may allow for entry of sender identification information and sender account information, the latter of which authorizes withdrawal of funds from an account with a financial institution to fund the money transfer. As another example, the send computer 12 may be configured to receive money transfer send information from the sender via telephone or interactive voice recognition systems. As a further example, a telephone at the send location 14 may be used to contact a call center (not shown) to initiate a send request to the server 20. The send computer 12 may also be located remotely from the send location 14.

The receive location 18 may be a facility that is approved by the financial services organization to provide redemption requests for sent money transfers to the server 20 and issue funds to money transfer receivers upon approval of the redemption requests. The receive location 18 may be a store or dedicated location that provides redemption services for money transfers. Alternatively, the receive location 18 may access a computer remotely, such as via a telephone call or the internet. The receive computer 16 at the receive location 18 may be operated by an agent at the approved receive location 18. The receive computer 18 may include software that facilitates entry of information to request redemption of money transfers for subsequent transmission to the server 20 for approval. The agent at the receive location 18 also, in some cases, reviews the identification of the money transfer receiver and, if approved, issues funds to the money transfer receiver. The receive location 18 may also include a telephone or other voice communications device to contact the financial services organization if questions arise during the money transfer receipt process. While a single receive location 18 is shown in FIG. 1, in actual implementation, the system 10 includes a plurality of receive locations 18 that each include a receive computer 16 that communicates with the server 20.

In alternative embodiments, the receive computer 16 may be any computer configured to provide information to the server 20 via a secure internet or server connection. For example, the receive computer 16 may be a home computer, kiosk, or other interactive device with an associated receiver interface 24 (e.g., keyboard, touch screen). The receive computer 16 may include a web browser or other application that provides a user interface to enter information to receive a money transfer. The web browser may allow for entry of receiver identification information that may be used to authorize release of the money transfer funds to the receiver. As another example, a telephone at the receive location 18 may be used to contact a call center (not shown) to initiate a send request to the server 20. The receive computer 16 may also be located remotely from the receive computer 16.

The server 20 may be housed and/or operated by or on behalf of the financial services organization that, among other functions, approves and coordinates send transactions of money transfers at the send location 14 and receive transactions of money transfers at the receive location 18. The server 20 facilitates approval of send requests from the send location 14 and receive requests from the receive location 18. In some embodiments, the server 20 is configured to process send and receive requests automatically. In other embodiments, the server 20 provides information to a user at the financial services organization for review and approval. For example, the server 20 may be connected to a computer 26 that provides an interface to a user at the financial services organization to review and approve or deny money transfer send or receive transactions. In some embodiments, the server 20 provides compliance functions for money transfer transaction. The server 20 includes storage capabilities to store information from money transfer send transactions for later retrieval during the money transfer receive approval process. In addition, the server 20 may store other information such as, for example, past customer money transfer send/receive activity, customer account information, and computer identification and log-in information for the send computer 12 and receive computer 16. The information for a customer may be stored in the server 20 as a customer or user profile.

As will be discussed in more detail herein, the system 10 is configured to promote the financial services organization and its products and services (e.g., money transfers) by encouraging customers and potential customers to participate in games or contests generated by the system 10. In one example, the system 10 generates trivia questions for customers and potential customers to answer. In the illustrated embodiment, the system 10 includes a promotion engine computer 30 associated with the server 20 operated by the financial services organization to generate the games or contests. The promotion engine computer 30 is configured to generate the games or contests, which are accessible by the customers or potential customers by communicating with the server 20 via various means. The games and contests generated by the promotion engine computer 30 are designed to encourage customers and potential customers to access and interact with various products, services, and media managed by the financial services organization, thereby leading to increased exposure and usage of the products and services offered by the financial services organization.

In some embodiments, the promotion engine computer 30 uses information on the server 20 to generate customized games or contests for customers and potential customers. For example, the promotion engine computer 30 may access a user profile for a customer or potential customer in a user profile database stored on the server 20. As discussed above, the user profile may include past customer money transfer send/receive activity and customer account information. In addition, the user profile on the server 20 may store more personal information about the user assembled from various sources. In some embodiments, the server 20 is configured collect information about a user's personal interests, demographics, education level, career, family, shopping habits, and so on from the user's activity and volunteered information on the internet. For example, the server 20 and server computer 26 can be configured to manage social media accounts (e.g., Facebook, Twitter, LinkedIn, etc.) that interact with social media accounts of customers and potential customers. The interactions with social media accounts of customers and potential customers allows the server 20 to assemble information about the customers and potential customers, as well as the people, companies, and organizations, with which the customers and potential customers interact with their social media account. Using the information assembled by the server 20, the promotion engine computer 30 can generate games or contests that are designed or tailored to the customer or potential customer. For example, if the user profile for a customer or potential customer indicates a preference for rock music, the server 20 may generate a game or contest (e.g., a trivia question) for the customer or potential customer that relates to rock music.

The promotion engine computer 30 may also be configured to generate games or contests related to the date or events surrounding the date. For example, the date of the game or contest is near a holiday, such as Christmas, the promotion engine computer 30 can generate a game or contest related the holiday. As another example, if a historical event occurred around the date of the game or contest, the game or contest may relate to the historical event (e.g., a trivia question about the historical event). As a further example, if events of societal or social significance are occurring around the date of the game or contest (e.g., governmental election, sports championship, etc.), the game or contest may relate to the parties, teams, or individuals involved in the event of significance.

In order to participate in the game or contest, the server 20 may maintain a customer relations portal that allows the customer or potential customer to access the game or contest for participation. The customer relations portal can be configured to provide a user interface to a device associated with the customer or potential customer that presents the game or contest and allows the customer or potential customer to provide a response or otherwise participate in the game or contest. For example, the customer or potential customer may access the customer relations portal via the send computer 12 at the send location 14 or the receive computer 16 at the receive location 18. The customer relations portal may also be accessed via a user's personal device, such as a telephone 32 (e.g., cell phone) or a user's computer 34, as will be described in more detail below.

Figure 2:
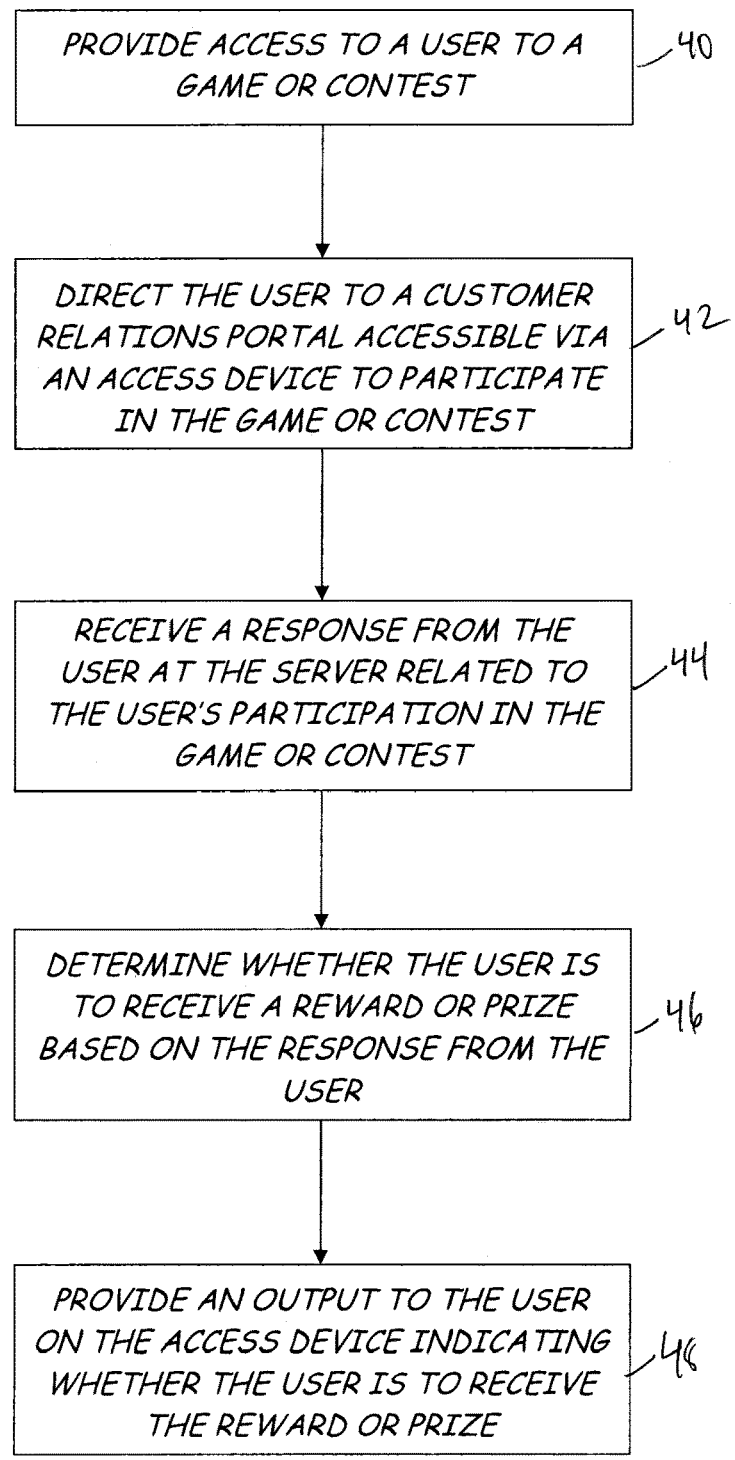
FIG. 2 is a flow diagram of a method for providing customers of a money transfer system with a reward or prize for participating in a promotion associated with the money transfer system.

FIG. 2 is a flow diagram of an embodiment of a process for providing a game or contest to a customer or potential customer through the system 10. In step 40, the server 20 provides access to the game or contest generated by the promotions engine computer 30. After the promotions engine computer 30 generates a game or contest as described above, the server 20 brings the game or contest live such that customers and potential customers can participate in the game or contest. The server 20 may provide access to the game or contest in a variety of ways, such as through interaction upon purchasing a product or service (e.g., money transfer) at the send location 14 or receive location 18, direct messaging or other interaction with the customer or potential customers, social media blasts, print advertising, radio and television advertising.

When access to the game or contest is provided, in step 42, the customer or potential customer is directed to the customer relations portal accessible via an access device (e.g., send computer 12, receive computer 16, telephone 32, or user's computer 34), to participate in the game or contest. For example, the server 20 may provide a game or contest, or instructions for accessing or participating in the game or contest, on a receipt for a money transfer transaction at the send location 14 or the receive location 18. In some embodiments, an access code is printed on the receipt that may be used to access the customer relations portal on the server 20 via the send computer 12, receive computer 16, telephone 32, or user's computer 34. The printed receipt may direct the user to a website accessible via the send computer 12, receive computer 16, telephone 32, or user's computer 34 on which the customer or potential customer can enter the access code and/or a response to the game or contest. The game or contest can alternatively be accessed by responding to the game or contest by text messaging or placing a phone call via the telephone 32.

As another example, the customer or potential customer may be directed to the game or contest via an advertisement presented on a television, radio, computer, or print advertisement. As with the receipt, the advertisement may include the game or contest, or instructions for accessing the game or contest. The game or contest may be accessible via a website, for example, as described above, or by responding to the game or contest associated with the advertisement by text messaging or placing a phone call via the telephone 32. In some embodiments, the advertisement includes a code that can be scanned by the telephone 32 or computer 34 that directs the telephone 32 or computer 34 to the customer relations portal for access to the game or contest. For example, in some embodiments, the scannable code includes a bar code or quick response (QR) code.

As a further example, the customer or potential customer may learn about the game or contest via a direct message (e.g., email) or via a social media blast or message. In one example, the customer or potential customer follows or "likes" a page associated with the financial services organization, and the customer or potential customer receives a notification on their page of the game or contest. The customer or potential customer is then directed to the customer relations portal via a link to participate in the game or contest. Alternatively, the customer or potential customer may participate in the game or contest by responding to the direct message or responding on the social media website. In some embodiments, in addition to participating in the game or contest on the social media website, the customer or potential customer is provided a user interface by which the customer or potential customer can share the game or contest with other social media members (e.g., "friends") who may be interested in participating in the game or contest. When the customer or potential customer shares the game or contest with others, the customer or potential customer may be given a reward or prize. For example, the customer or potential customer may be given loyalty points, which may be used toward discounts on products and services offered by the financial services organization.

In step 44, the server 20 receives a response from the customer or potential customer via inputs in the customer relations portal. The response relates to the customer's or potential customer's participation in the game or contest. For example, if the game or contest includes one or more trivia questions, the response includes answers to the trivia questions.

In step 46, the server 20 determines whether the customer or potential customer is to receive a reward or prize based on the response from the customer or potential customer. For example, in the case of the game or contest including one or more trivia questions, the server 20 and promotions engine computer 30 compare the answers provided by the customer or potential customer to answers stored in the server 20 to determine whether the customer or potential customer has provided correct answers to the one or more trivia questions. If the questions were answered correctly, the customer or potential customer receives a reward or prize. In some cases, if the customer's or potential customer's response to the game or contest does not qualify them for a reward or prize (e.g., incorrectly answered one or more trivia questions), the server 20 may determine that the customer or potential customer is eligible for a consolation prize (e.g., loyalty points) for participating in the game or contest.

In some embodiments, the server 20 also determines whether the customer or potential customer was one of the first predetermined number of participants to respond to the game or contest with a response that qualifies for a reward or prize. For example, in a game or contest (e.g., trivia question) presented in a television or radio advertisement, the reward or prize may only be available to the first ten participants who provide a response that qualifies for a reward or prize (e.g., via text message on the telephone 32).

In step 48, the server 20 provides an output to the customer or potential customer on the device used to access the customer relations portal indicating whether the customer or potential customer is to receive a reward or prize for their answer. For example, if the customer or potential customer accesses the customer relations portal via a web site hosted by the server 20, the website may immediately provide an indication to the customer or potential customer as to whether a reward or prize has been won. As another example, if the customer or potential customer responds to the game or contest via a text message, the server 20 may provide the customer or potential customer with a return text message indicating whether a reward or prize has been won. The response from the server 20 may also indicate the reward or prize won by the customer or potential customer. In some embodiments, the reward or prize is discounted or complimentary products or services offered by the financial services organization.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A promotions engine computer for promoting money transfers, the computer comprising:
   a user interface;
   a processor communicatively coupled to the user interface, wherein the processor is configured to:
      receive, via a user interface, information identifying a user;
      transmit, to a server, the information identifying the user;
      receive, from the server, a generated customized game based on the information identifying the user, wherein a prize associated with the generated customized game is at least one of discounted or complimentary products or discounted or complimentary services for a money transfer system; and
      output, to the user interface, the generated customized game.

2. The system of claim 1, wherein the processor is further configured to:
   receive, from the user interface, a promotional code;
   transmit, to the server, the promotional code; and
   wherein the generated customized game is based on the promotional code.

3. The system of claim 1, wherein the processor is further configured to:
   receive, via the user interface, at least one answer in response to the generated customized game;
   transmit, to the server, the at least one answer;

receive, from the server, a notification whether the user is eligible or ineligible for a prize based on the at least one answer; and output, to the user interface, the notification whether the user is eligible or ineligible for the prize based on the at least one answer.

4. The system of claim 3, wherein the notification includes whether the user is eligible or ineligible for a consolation prize based on the at least one answer.

5. The system of claim 1, wherein the user is eligible for the prize associated with the generated customized game when the user is one of a first predetermined number of participants.

6. The system of claim 1, wherein the user is eligible for the prize associated with the customized game when the user has shared the customized game with another user.

7. The system of claim 1, wherein the generated customized game is based at least in part on a date the processor transmits, to the server, the information identifying the user.

8. The system of claim 1, wherein the generated customized game is based at least in part on a user profile of the user.

9. The system of claim 1, wherein the generated customized game is based at least in part on at least one of: past money send activity and past money receive activity of the user.

10. The system of claim 1, wherein the generated customized game is based at least in part on information associated with the user's social media accounts.

11. A computer-implemented method for promoting money transfers, comprising:
receiving information identifying a user;
transmitting, to a server, the information identifying the user;
receiving, from the server, a generated customized game based on the information identifying the user, wherein a prize associated with the generated customized game is at least one of discounted or complimentary products or discounted or complimentary services for a money transfer system; and
outputting the generated customized game.

12. The method of claim 11, the method further comprising:
receiving a promotional code;
transmitting, to the server, the promotional code; and
wherein the generated customized game is based on the promotional code.

13. The method of claim 11, the method further comprising:
receiving at least one answer in response to the generated customized game;
transmitting, to the server, the at least one answer;
receiving, from the server, a notification whether the user is eligible or ineligible for a prize based on the at least one answer; and
outputting the notification whether the user is eligible or ineligible for the prize based on the at least one answer.

14. The method of claim 13, wherein the notification includes whether the user is eligible or ineligible for a consolation prize based on the at least one answer.

15. The method of claim 11, wherein the user is eligible for the prize associated with the generated customized game when the user is one of a first predetermined number of participants.

16. The method of claim 11, wherein the user is eligible for the prize associated with the customized game when the user has shared the customized game with another user.

17. The method of claim 11, wherein the generated customized game is based at least in part on a date the processor transmits, to the server, the information identifying the user.

18. The method of claim 11, wherein the generated customized game is based at least in part on a user profile of the user.

19. The method of claim 11, wherein the generated customized game is based at least in part on at least one of: past money send activity and past money receive activity of the user.

20. The method of claim 11, wherein the generated customized game is based at least in part on information associated with the user's social media accounts.

* * * * *